US006984116B2

(12) United States Patent
Lee et al.

(10) Patent No.: US 6,984,116 B2
(45) Date of Patent: Jan. 10, 2006

(54) PROCESS AND APPARATUS FOR CRYSTALLIZATION OF POLYTRIMETHYLENE TEREPHTHALATE (PTT)

(75) Inventors: James Gao Lee, Houston, TX (US); Thomas Louis De Lellis, Katy, TX (US); Edward James Denton, Richmond, TX (US); Kevin Dale Allen, Prairieville, LA (US); Stefan Deiss, Harxheim (DE); Klaus Mackensen, Frankfurt am Main (DE)

(73) Assignee: Shell Oil Company, Houston, TX (US)

( * ) Notice: Subject to any disclaimer, the term of this patent is extended or adjusted under 35 U.S.C. 154(b) by 134 days.

(21) Appl. No.: 10/805,866

(22) Filed: Mar. 22, 2004

(65) Prior Publication Data

US 2004/0176565 A1 Sep. 9, 2004

Related U.S. Application Data

(62) Division of application No. 10/303,477, filed on Nov. 25, 2002, now Pat. No. 6,740,733.

(60) Provisional application No. 60/334,353, filed on Nov. 30, 2001.

(51) Int. Cl.
*B28B 17/00* (2006.01)
*B29B 9/16* (2006.01)
*C08J 3/00* (2006.01)

(52) U.S. Cl. .............................. 425/6; 526/64; 526/65; 528/499; 528/502; 528/503

(58) Field of Classification Search ..................... 425/6; 526/64, 65; 528/499, 502, 503
See application file for complete search history.

(56) References Cited

U.S. PATENT DOCUMENTS

| | | | | |
|---|---|---|---|---|
| 1,710,522 A | | 4/1929 | Trumbo et al. | |
| 2,240,718 A | | 5/1941 | Schiffman et al. | 209/6 |
| 2,375,487 A | | 5/1945 | Newhouse | 263/44 |
| 3,799,334 A | | 3/1974 | Collins | 209/11 |
| 3,981,959 A | | 9/1976 | Cuff | 264/142 |
| 4,382,050 A | | 5/1983 | Seng | 264/40.4 |
| 4,683,665 A | | 8/1987 | Geelen | 34/65 |
| 5,020,695 A | | 6/1991 | de Almeida Thompson et al. | 222/185 |
| 5,032,255 A | | 7/1991 | Jauncey | 209/38 |
| 5,290,913 A | | 3/1994 | McAllister et al. | 528/483 |
| 5,403,528 A | | 4/1995 | Fowler | 264/130 |
| 5,532,335 A | | 7/1996 | Kimball et al. | 528/495 |
| 6,297,315 B1 | * | 10/2001 | Duh et al. | 524/605 |

FOREIGN PATENT DOCUMENTS

| | | |
|---|---|---|
| JP | 01-180309 | 7/1989 |
| JP | 04-197710 | 7/1992 |
| JP | 05-147026 | 6/1993 |
| WO | 99/61220 | 12/1999 |
| WO | 00/68294 | 11/2000 |

* cited by examiner

*Primary Examiner*—Samuel A. Acquah

(57) ABSTRACT

Disclosed is a process for reducing the self-adhesiveness of polytrimethylene terephthalate pellets, which can be carried out in a continuous or batch manner comprising the steps of:

a) introducing polytrimethylene terephthalate pellets having an intrinsic viscosity of at least about 0.4 dl/g into a conduit containing a liquid which is moving through the conduit, thereby causing the pellets to move through the conduit with the liquid;

b) adjusting the temperature of the pellets and the liquid to a temperature of about 50 to about 95° C. for a time sufficient to induce a degree of crystallinity of at least about 35% in the pellets; and c) separating the pellets from the liquid.

12 Claims, 1 Drawing Sheet

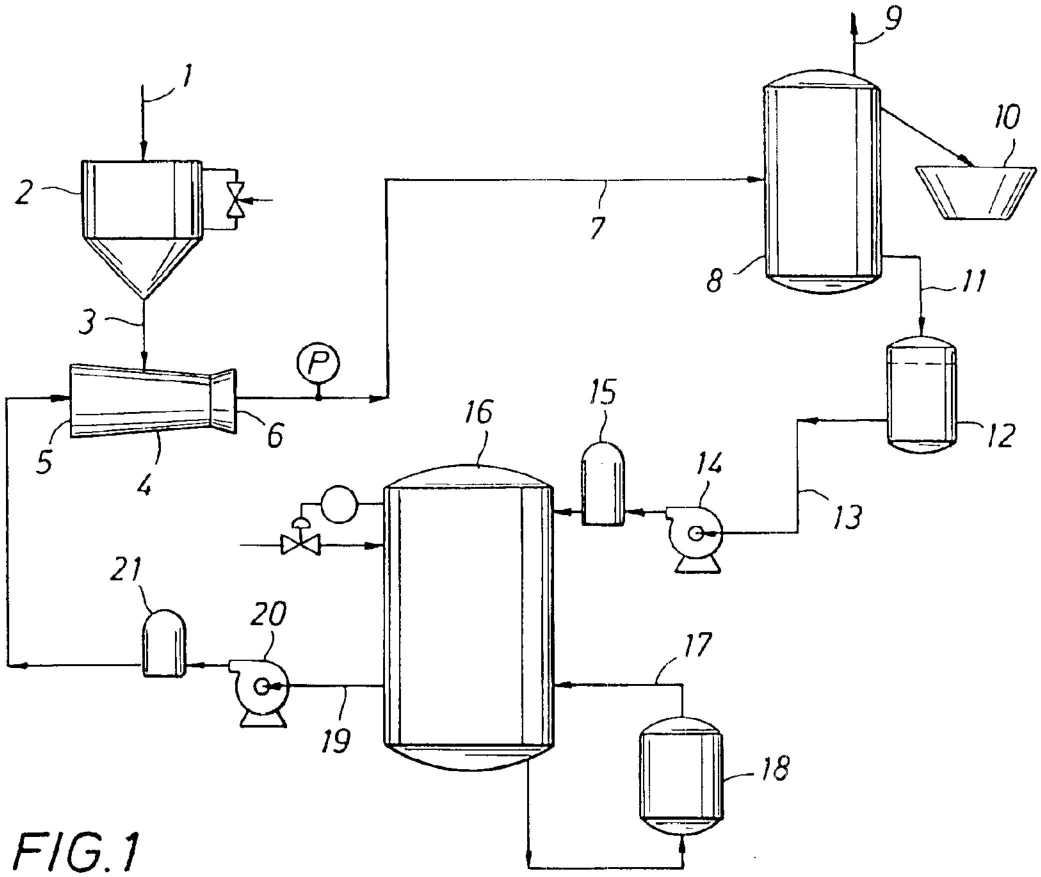
FIG. 1
FIG. 2
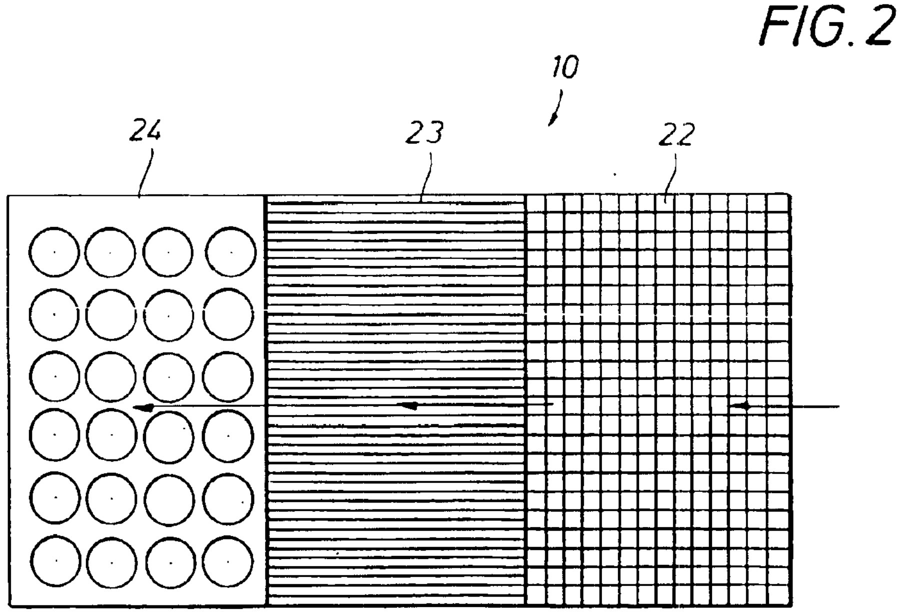

PROCESS AND APPARATUS FOR CRYSTALLIZATION OF POLYTRIMETHYLENE TEREPHTHALATE (PTT)

This is a division of application Ser. No. 10/303,477 filed Nov. 25, 2002, now U.S. Pat. No. 6,740,733, the entire disclosure of which is hereby incorporated by reference, which claims the benefit of U.S. Provisional Application Ser. No. 60/334,353 filed Nov. 30, 2001, the entire disclosure of which is hereby incorporated by reference.

FIELD OF THE INVENTION

This invention relates to the preparation of 1,3-propanediol based polyesters such as polytrimethylene terephthalate (hereafter PTT). More particularly this invention relates to a process for achieving a degree of crystallization of PTT which will prevent pellet blocking and agglomeration. In one aspect, the invention relates to a process that can be carried out in a continuous manner, as well as batch. In another aspect, the invention relates to an apparatus for the continuous crystallization of polytrimethylene terephthalate (PTT).

BACKGROUND OF THE INVENTION

Polytrimethylene terephthalate is a polyester useful in fiber applications in the carpet and textile industries. The manufacture of polytrimethylene terephthalate involves the condensation polymerization of 1,3-propanediol and terephthalic acid to a polymer having an intrinsic viscosity (hereafter referred to as IV) of about 0.4 to 1.0 dl/g. The polymer melt is discharged from the melt reactor and extruded through an extrusion die into strands. The strands are quenched in cold water and cut into pellets for storage or transportation.

It has been found that polytrimethylene terephthalate pellets tend to adhere together, or block, during storage or shipping at temperatures above the polymer glass transition temperature Tg (about 45° C.), which temperature can easily be reached during storage in a silo, rail car, or hopper. Agglomeration of the pellets can also occur during drying.

BRIEF SUMMARY OF THE INVENTION

In accordance with the foregoing, the present invention is a continuous process and apparatus for crystallizing pellets of polytrimethylene terephthalate in order to prevent blocking which comprises:

a) introducing polytrimethylene terephthalate pellets having an intrinsic viscosity of at least about 0.4 dl/g into a conduit containing a liquid which is moving through the conduit, thereby causing the pellets to move through the conduit with the liquid;

b) adjusting the temperature of the pellets and the liquid to a temperature of about 50 to about 95° C. for a time sufficient to induce a degree of crystallinity of at least about 35% in the pellets; and c) separating the pellets from the liquid.

The process is preferably carried out in a continuous liquid pellet suspension apparatus comprising, for example, a hot water crystallization (HWC) pipe, at a sufficient flow rate to retard settling of pellets. The desired pellet properties are generally reached in a residence time in the conduit within the range of about 3 seconds to about 5 minutes. It is preferred that weight ratio of the liquid to the pellets be from about 5:1 to about 200:1, most preferably about 10:1 to about 100:1.

In one aspect of the practice of the invention, crystallized pellets are cooled to a temperature below their glass transition temperature during classification to remove fines and oversized pellets. The combined classifier-cooler includes a screen for removing pellet fines, dust and undersized pellets, a slice plate section having air flowing through, preferably from underneath, to cool the pellets, and a perforated plate through which pellets of the desired size will pass and which retains oversized pellets.

BRIEF DESCRIPTION OF THE FIGURES

FIG. 1 is a schematic process flow diagram of a hot water crystallization (HWC) unit.

FIG. 2 is a block diagram of the combined classification and cooling section.

DETAILED DESCRIPTION OF THE INVENTION

The invention involves the preparation of polytrimethylene terephthalate pellets characterized by improved stability against blocking at elevated temperatures. The invention process overcomes the problem of polytrimethylene terephthalate pellets adhering together during hot weather storage or transportation, and enables drying of the pellets in a hopper-type dryer prior to melt processing or solid-state polymerization. The process also assists in reducing fines, which can be generated in the manufacture and processing of polytrimethylene terephthalate. The resulting partially crystallized polytrimethylene terephthalate pellets can be spun into fibers or made into film or engineering thermoplastics.

In general, polytrimethylene terephthalate is prepared by reacting, at elevated temperature, a molar excess of 1,3-propanediol with terephthalic acid in a multi-stage (esterification/polycondensation) process, with removal of by-product water, for a time effective to produce polytrimethylene terephthalate. The polymerization conditions are selected so as to produce molten polyester having a target intrinsic viscosity of at least about 0.4 dl/g, preferably about 0.4 to about 1.0 dl/g. Polytrimethylene terephthalate may also be produced by the reaction of 1,3-propanediol with dimethyl terephthalate.

For example, the polytrimethylene terephthalate (PTT) is discharged from the melt reactor and passed through an extrusion die to form polymer melt strands which are cooled and partially solidified by contact with cold water on a strand guide. The sequence of pelletization/crystallization is not critical. Pre-pelletizing crystallization involves immersion of polymer melt strands in hot water prior to cutting of the strands, preferably en route from the extruder to the pelletizer. The preferred method, however, for process efficiency and pellet quality, and for practice in conjunction with the present invention, is to conduct crystallization downstream of pelletization.

In the present invention we have found a process design for producing PTT pellets exhibiting sufficient crystallinity to prevent agglomeration, which process has several advantages not previously available in any similar process. The process is efficient in that a typical drying step prior to crystallization can optionally be omitted, the pellets are crystallized while being transported, and the process can be operated in a continuous manner, as well as the more common batch operation. Furthermore, by controlling the temperature of the liquid, the degree of crystallinity of the pellets can be controlled. It is desirable that they not be too soft or they will agglomerate but if they are too brittle, an unacceptable amount of fines will be produced. In addition, a stirred tank having a physical agitator, such as a blade, is not required, thus greatly reducing damage (abrasion) to the pellets. The process is also economical, as will be apparent to those skilled in the art from the description below of the relatively inexpensive materials employed.

The polymer strands are cut to pellets of, for example, ⅛ inch by ⅛ inch (0.3 cm by 0.3 cm). Pelletizing may be accomplished with a strand-cut pelletizer or an underwater pelletizer or by other means. In the preferred embodiment herein a strand-cut pelletizer was employed. Immediately after pelletization, the surfaces of the pellets are solid while the cores are still partially molten and have a low degree of crystallinity.

Since the PTT crystallization of the present invention is executed in a hot water medium, at about 50 up to about 95° C., the cold water used in pelletizing is preferably separated from the polymer pellets before the pellets reach the hot water crystallization unit (hereafter referred to as HWC). In the following description, the pellets are dry-cut, but the process could be operated to accommodate wet pellets.

The pellets are delivered from the pelletizer to the HWC by way of a washdown hopper. Referring to FIG. 1, in the present invention the pellets 1 are received in the washdown hopper 2 of a hydraulically driven (preferably water) eductor 4. The eductor is generally funnel shaped and provides its own induction force to pull the pellets into the top side 3 of the eductor by the creation of a vacuum due to the flow of water through the eductor in the direction of eductor inlet 5 to eductor tip 6.

The pellets are then drawn to the tip 6 of the eductor 4 and carried by hydraulic medium, again preferably water, to the inside of the hot water crystallization pipe 7. The pipe can be made of any material that can meet the temperature requirement, including materials, such as, for example, chlorinated polyvinylchloride (CPVC). The temperature of the water in the crystallization pipe 7 is adjusted to about 50° C. to about 95° C. and the crystallization of PTT is achieved via hot water contact with polymer pellets. The residence time of hot water crystallization is controlled by the pipe length and water flowrate. The water temperature may be controlled by a heater temperature control 18 installed in line 17.

The separation of hot water from the pellets is achieved in a centrifugal dryer 8 which has a vent 9 and is connected to the classifier 10. The pellets may be cooled in the dryer 8 or they may be cooled in the classifier 10 as described below or they may be cooled by other means.

The flow of water through the HWC moves the pellets along. Water flows from the storage tank 16 through line 19 to water pump 20 and then through optional filter 21 to the inlet 5 of eductor 4. The water is circulated from dryer 8 via line 11 to a water surge tank 12 and recycled for reuse through line 13 back to the hot water storage tank 16, preferably after filtering at 15 to remove pellet dust and fines from the water stream. A water pump 14 in line 13 helps to move the water.

Crystallization is achieved in the flowing hot water stream inside the crystallization conduit which can be any elongated conduit and is located between the pelletizer and the pellet dryer. The conduit may have a diameter suitable in proportion to the rest of the equipment. The diameter may suitably be in the range of about 2 (5.1) inches to about 10 (25.4) inches (centimeters) or more, but is preferably in the range of about 4 (10.2) to about 6 (15.2) inches (centimeters).

A very broad range of compositions is suitable for construction of the hot water crystallization conduit. It is only necessary that the material meet the temperature and pressure requirements of the desired operation. Examples of suitable materials include, but are not limited to CPVC, stainless steel, brass, and copper. CPVC may be employed with good results without the use of insulation.

A liquid pellet suspension or slurry exemplified by the present invention is preferred because it offers uniform residence time and uniform heating of the pellets in order to produce pellets of uniform crystallization and opacity. The hot water suspension or slurry of pellets is moved through the conduit at a rate which results in the desired hot water contact time. The water flow rate should be high enough to prevent PTT pellets from settling. The conduit should be long enough to offer the required residence time. A suitable residence time is in the range of about 3 seconds to about 5 minutes, preferably about 30 seconds to about 3 minutes, more preferably about 1.5 to about 2 minutes. It can take longer at temperatures at the lower end of the range. An additional advantage of this invention is that the pellets are moving by turbulent flow rather than by agitation, as in stirred tank process designs, and incur less damage due to abrasion.

The flow system should have sufficient flexibility to control and adjust the flow rate in the crystallization conduit and also to adjust the water to pellet ratio if desired. The water to pellet weight ratio is preferably from about 5:1 to about 200:1, most preferably about 10:1 to about 100:1.

The residence time required to heat up PTT pellets from ambient temperature to the target temperature in a turbulent hot water stream can be calculated using the following:

$$\theta = \frac{cwV}{hA}\mathrm{Ln}\frac{T - T_{fi}}{T - T_i} \qquad \text{(Eq. 1)}$$

where θ is the time required to achieve temp T across the pellet, $T_i$ is the initial surface temperature of the PTT pellet, $T_{fi}$ is the ambient fluid temperature, T is the uniform pellet temperature at instant time θ, c is the average heat capacity of PTT pellets (between 20° C. and 80° C., c=0.131 BTU/LB·° F. [0.548 kJ/kg·° K]), w is the volume of one PTT pellet=$5.918\times10^{-7}$ $ft^3$ [$0.168\times10^{-7}$ $m^3$] (for a ⅛ inch [0.3 cm] by ⅛ inch [0.3 cm] pellet), A is the surface area of one PTT pellet=0.001363 $ft^2$ [0.0001266 $m^2$] (again for a ⅛ inch [0.3 cm] by ⅛ inch [0.3 cm] pellet), h is the uniform value of the surface heat conductance, i.e. the heat transfer coefficient between water and PTT pellets. The surface conductance h can be calculated from Equation 2:

$$hd_P/h_F = (0.35 + 0.56N_{Re}^{0.5})N_{Pr}^{0.31} \qquad \text{(Eq. 2)}$$

where $$N_{Re} = \frac{v_R d_P}{\eta_F}$$

$$N_{Pr} = \frac{h_F}{C_{P,F}\eta_F}$$

Where $d_P$ is the diameter of PTT pellets=⅛ inch (0.3 cm), $h_F$ is the thermal conductivity of fluid (water)=0.3795 BTU/hr·ft·° F. (0.6568 W/m·° K) at 70° C., $N_{Re}$ is Reynolds number, $v_R$ is relative velocity between polymer pellets and water in feet/sec, $\eta_F$ is the viscosity of fluid, $N_{Pr}$ is Prantl number, $C_{P,F}$ is the heat capacity of fluid.

It was assumed in these calculations that there is negligible internal resistance inside the pellet for heat transfer and that the pellet is of an elongated spherical shape.

Estimations regarding the minimum linear velocity (flow rate) of PTT pellets/water slurry to prevent the pellets from settling in the water stream can be derived using the following relationship, for pellet content below about 15 wt % (water:pellet weight ratio of about 6.67:1) in water:

$$U_M = 120.4 D_P \left(\frac{d_P}{D_P}\right)^{0.17} \left(\frac{\rho_P - \rho_F}{\rho_F}\right)^{0.5} \quad \text{(Eq. 3)}$$

where $U_M$ is the minimum fluid velocity without pellets settling, $D_P$ is the pipe internal diameter, $d_P$ is the pellet diameter, $\rho_P$ is the pellet density, and $\rho_F$ is the fluid density.

To ensure that the pellets are sufficiently crystallized to prevent blocking, it is desirable to crystallize the pellets to the extent that the product does not exhibit a conspicuous cold crystallization peak on its DSC thermogram. The imparted degree of crystallization is related to the starting polymer density and IV, the temperature of the water, and the length of time the polymer is immersed. The following chart provides general guidance on immersion times required to achieve about 35% or greater crystallinity (for non-delustered polytrimethylene terephthalate) over the temperature range of 60 to 100° C.

| Water Temperature (° C.) | Crystallization Time |
|---|---|
| 60 | 20 minutes |
| 65 | 3 minutes |
| 70 | 30 seconds |
| 80 | 10 seconds |
| 90 | 5 seconds |
| 100 | 3 seconds |

For commercial operation, the desirability of faster crystallization must be balanced against the cost of maintaining higher water temperatures. The upper temperature is also limited by the tendency of polytrimethylene terephthalate to undergo hydrolytic degradation (detected as a decrease in intrinsic viscosity) at temperatures above about 95° C. Preferably, the water temperature is within the range of about 65° C. to about 85° C. and the polymer is immersed for no longer than about 3 minutes, preferably for a time within the range of about 30 seconds to about 3 minutes, with delustered polymer generally requiring longer immersion than non-delustered polymer.

Polytrimethylene terephthalate pellets treated by the invention process generally have an opaque appearance and generally exhibit the following physical properties:

Density of at least about 1.33 g/cm$^3$

Crystallinity of at least about 35%

Tg of at least about 55° C., preferably at least about 60° C.

Apparent crystallite size of at least about 10 nm

As used herein, crystallinity refers to an increase in the crystalline fraction and a decrease in the amorphous fraction of the polymer. In general, crystallinity greater than about 35%, preferably within the range of about 36 to about 45%, is desired. The calculation of crystallinity herein is based on the relationship of volume fractional crystallinity ($X_c$) of a sample to the density ($D_s$) of the sample:

$$X_c = (D_s - D_a)/(D_c - D_a)$$

where $D_s$ is the density of the sample, $D_a$ is the density of amorphous polytrimethylene terephthalate (=1.295 g/cm$^3$) and $D_c$ is the density of polytrimethylene terephthalate crystal (=1.387 g/cm$^3$). The weight fractional crystallinity equals $(D_c/D_s)*X_c$.

After the selected residence time in the hot water crystallization conduit, the pellet/water slurry may be discharged into a pellet dryer. The temperature of the PTT pellets after HWC may be about 70 to about 80° C. To reduce the tendency of the PTT pellets to block during storage, the PTT pellets may be cooled below their glass transition temperature. The pellets may be cooled to a temperature below about 60° C. either by cold water quench en route to the dryer or, if the dryer environment is sufficiently cool, in the dryer itself. The glass transition temperature of PTT pellets with crystallinity of about 36 weight percent is around 50° C. Therefore the PTT pellets should be cooled below about 50° C. or agglomeration can occur again.

The pellet dryer can include a mechanism for water removal by centrifugal force. The pellets may be cooled in the dryer or elsewhere. After the dewatering and drying operation is completed, the pellets are passed to a classifier. The object of the classifier is to remove fines and oversized pellets. Pellet fines, dust, and undersizes are removed first by passing pellets through a screen. Pellets are then passed through a perforated plate where the oversized pellets are retained on the plate and are removed whereas the pellets of the desired size pass through the plate.

In preferred embodiment of the present invention the steps of classifying and cooling the crystallized PTT pellets to below about 50° C. are accomplished with one piece of classification equipment. A cooling section is inserted between two pellet classification sections. A block diagram of an apparatus for cooling the pellets while classifying is shown in FIG. 2. This apparatus is incorporated into the classifier 10 shown in FIG. 1. After the drying operation, the PTT pellets are introduced to a classifier, 10. Pellet fines, dust, and undersizes are removed first by passing the pellets through a screen, 22. The screen 22 is typically, but not limited to, 8-mesh 0.025-inch diameter wire screen made of stainless steel. Pellets are then passed through a slice plate section 23 where air is flowing through from underneath to pass through the slice plate to cool the pellets. The air can be at any temperature, as long as the air temperature is below the pellet temperature. The air can be incorporated in a number of ways. One effective method was to use air from a centrifugal blower with an air temperature of, for example, about 25 to about 30° C. Cooling air could also be generated by suction from the classifier. The pellets are then moved to a perforated plate 24, where the oversized pellets are retained on the plate and are removed, wherein the pellets of the desired size pass through the plate. This perforated plate 24 used remove oversizes is typically, but not limited to, 16 gauge stainless steel perforated with 7/32 inch round holes. Those skilled in the art will see variations that can be made within the scope of the invention.

In calculating the residence time required to cool PTT pellets from, for example, about 80° to about 40° C., it is assumed again that there is negligible internal resistance inside the pellet for heat transfer and the pellet is of an elongated spherical shape. Assuming a 1/8 inch by 1/8 inch PTT pellet (here regarded as a 1/8 inch sphere) being cooled from some initial uniform temperature state $T_i$ in a flowing air stream of temperature $T_f$, the heat conduction equation for the pellet leads to the following:

$$\theta = \frac{cwV}{hA} \mathrm{Ln} \frac{T - T_f}{T - T_i} \quad \text{(Eq. 4)}$$

where θ is the time required to achieve temperature T across the pellet, $T_i$ is the initial surface temperature of the PTT pellet, $T_f$ is the ambient fluid (air) temperature, T is the uniform pellet temperature at instant time θ, c is the average heat capacity of PTT pellets (between about 40° C. and about 80° C., c=0.2998 BTU/LB·° F. [1.255 kJ/kg·° K]), w is the specific weight of one PTT pellet, V is the volume of one PTT pellet, A is the surface area of one PTT pellet=0.001363 $ft^2$ (0.0001266 $m^2$) h is the uniform value of the surface heat conductance, i.e. the heat transfer coefficient between air and PTT pellets. The surface conductance h can be calculated from:

$$hd_P/h_F=(0.35+0.56N_{Re}^{0.5})N_{Pr}^{0.31} \quad \text{(Eq. 5)}$$

where $$N_{Re}=\frac{v_R d_P}{\eta_F}$$

$$N_{Pr}=\frac{h_F}{C_{P,F}\eta_F}$$

Where $d_P$ is the diameter of PTT pellets=⅛ inch (0.3 cm), $h_F$ is the thermal conductivity of fluid (air)=0.015 BTU/hr·ft·° F. (0.026 W/m·° K) at 27° C., $N_{Re}$ is Reynolds number, $v_R$ is relative velocity between polymer pellets and air, $\eta_F$ is the viscosity of air, $N_{Pr}$ is Prantl number, $C_{P,F}$ is the heat capacity of air.

To calculate the surface area of the cooling slice plate required to contact the pellets and the required flowrate, it was assumed:

1. The surface area in contact with pellets must be large enough to allow one single layer of pellets on the slice plate during cooling process.
2. The single pellet can be considered of cylindrical shape (⅛ inch [0.3 cm] in length and ⅛ inch [0.3 cm] in diameter).

One single PTT pellet volume is $5.918\times10^{-7}$ $ft^3$ ($0.168\times10^{-7}$ $m^3$), and PTT pellet density is 80.7 $lb/ft^3$ (1293 $kg/m^3$). With a 2 second residence time and 520 lb/hr (236 kg/hr) throughput, the number of pellets on the cooling slice plate 23 of FIG. 2 at any given moment is 6048 (where each pellet has a surface area of $1.085\times10^{-4}$ $ft^2$ [$0.1\times10^{-4}$ $m^2$]). This leads to a figure for the surface area of the slice plate of 0.656 $ft^2$ (0.06 $m^2$). Considering only a certain percentage of the slice plate area is the open area allowing air to pass through, then a 1.5 $ft^2$ (0.14 $m^2$) slot screen area may be employed with good results.

The air flow rate should be high enough to permit the air to pass through the gaps between pellets and have pellets fluidized with the support of the slice plate. The gap between any adjacent slice plate should be large enough to allow airflow through, while the gap should be small enough to not allow pellets to drop through. In practice the width of the slice plate may be suitably around 4 millimeters. It is preferred to not completely fluidize the pellets.

Although the process of the present invention is preferably carried out continuously, it could be operated as a batch process. The process is preferably carried out continuously for efficiency. Integration of crystallization into a continuous polymerization process may involve coordination with upstream and downstream processing, careful control of pellet residence time in the crystallizer for uniform crystallization of the pellets, recycling of water for reuse, along with additional means for filtration, temperature control, etc. In batch mode the pellet delivery to the eductor is carried out as discreet loads while the HWC loop recirculates constantly.

In either continuous or batch crystallization, the polytrimethylene terephthalate pellets will be immersed in hot water at temperatures within the range of about 50 to about 95° C., preferably about 65 to about 95° C., most preferably about 65 to about 85° C., for a time sufficient to achieve the desired crystallinity. This allows the latent heat to be used for auto crystallization. Directly after pelletization, the pellets have a latent energy which is high enough to initiate crystallization at about 50 to about 95° C. As used herein, crystallinity indicates the degree of crystallization. In general, crystallinity greater than about 35%, preferably within the range of about 36 to about 45%, measured as described above, is desired.

The following examples will serve to further illustrate the invention disclosed herein. The examples are intended only as a means of illustration and should not be construed as limiting the scope of the invention in any way. Those skilled in the art will recognize many variations that may be made without departing from the spirit of the disclosed invention.

EXAMPLE 1

A trial of the hot water crystallization (HWC) process and apparatus was conducted. The water temperature, water flow rate, pellet residence time in the water stream, and water pressure at the eductor for four trials are shown in Table 1. The pellet content in water was a little less than 2% wt—a water:pellet weight ratio of a little more than 50:1. In four separate experiments dry-cut pellets were fed into the HWC eductor with a flow rate of between 35 to 40 gpm (132.5 to 151.4 liters per minute). The water temperature, crystallinity before and after HWC, and the cooling effect with classification are shown in Table 2. The pellet crystallinities after HWC were all higher than 35% when the HWC water temperature was near or greater than 70° C. The glass transition temperatures of those hot water crystallized pellets were all above 55° C. and thus there were no agglomeration problems under all typical storage conditions and transport processes. Use of hot water temperatures below 60° C. would require longer residence time, i.e., longer HWC pipe.

In the last three runs, the pellets were cooled in the combined classification-cooling process as described above. In these three runs the pellet temperatures were measured by inserting a thermocouple into the pellet pile. The cooling section successfully cooled the pellets to a temperature below 50° C. The glass transition temperatures of these hot water crystallized pellets were all above the temperatures of the pellets and thus agglomeration problems did not occur when storing these pellets.

TABLE 1

| Hot water stream temp (° C.) | Water flowrate (GPM) (LPM) | Residence time of Pellets in Water stream (Seconds) | Water Pressure at Eductor (PSIG) (kPag) |
|---|---|---|---|
| 66 | 36.5 (138.1) | 100 | 50 (345) |
| 68 | 39 (147.6) | 93 | 60 (414) |
| 70 | 41.5 (157.1) | 86 | 70 (483) |
| 70 | 44.1 (166.9) | 81 | 80 (552) |

TABLE 2

| Hot water stream temp (° C.) | Crystallinity before HWC (%) | Crystallinity after HWC (%) | Pellet Temperature after Cooling with Classification (° C.) |
|---|---|---|---|
| 59.5 | 17.7 | 33.6 | — |
| 67.5 | 17.7 | 40.6 | 34.0–36.0 |
| 74.0 | 17.7 | 42.1 | 38.0–41.8 |
| 76.0 | 17.7 | 42.4 | 38.0–43.9 |

We claim:

1. An apparatus for reducing the self-adhesiveness of polymer pellets which comprises:

a) means for introducing polymer pellets into a conduit containing a liquid;

b) means for moving the liquid through the conduit;

c) means for controlling the temperature of the liquid;

d) means for separating the pellets from the liquid;

e) a classifier for removing pellet fines and dust and oversized pellets; and f) means for recycling the liquid.

2. The apparatus of claim 1 wherein the means of introducing the pellets into the conduit comprises a hopper and an eductor.

3. The apparatus of claim 1 wherein the conduit is a pipe having a diameter of in the range of about 2 (5.1) inches to about 10 (10.2) inches (centimeters).

4. The apparatus of claim 3 wherein the pipe has a diameter in the range of about 4 (10.2) to about 6 (15.2) inches (centimeters).

5. The apparatus of claim 1 wherein the conduit is long enough to afford a residence time sufficient to achieve a crystallinity of about 36 to about 45% in pellets of polytrimethylene terephthalate.

6. The apparatus of claim 1 wherein the means for separating tho pellets from the liquid is a centrifugal dryer.

7. The apparatus of claim 1 wherein the classifier further comprises a means for combined classifying and cooling.

8. The apparatus of claim 1 further comprising suction means in the classifier for generating air for cooling.

9. The apparatus of claim 1 further comprising a centrifugal blower which provides the air for cooling.

10. The apparatus of claim 1 which further comprises:

a) a screen for removing pellet fines, dust, and undersizes;

b) a slice plate section in which air flows through to cool the pellets; and c) a perforated bottom plate that retains oversized pellets.

11. At The apparatus of claim 10(a) further comprising that the screen is a 8 mesh 0.025 diameter wire screen made of stainless steel.

12. The apparatus of claim 10(c) further comprising that the bottom plate is a 16-gauge stainless steel perforated plate with 7/32 inch round holes.

* * * * *